(12) United States Patent
Hara et al.

(10) Patent No.: US 9,416,486 B2
(45) Date of Patent: Aug. 16, 2016

(54) METHOD FOR MANUFACTURING FLUORINE-CONTAINING POLYMER

(71) Applicants: DAIKIN INDUSTRIES, LTD., Osaka-shi, Osaka (JP); NISSIN CHEMICAL INDUSTRY CO., LTD, Echizen-shi, Fukui (JP)

(72) Inventors: Ryousuke Hara, Settsu (JP); Rumi Kawabe, Settsu (JP); Ikuo Yamamoto, Settsu (JP); Yuji Gama, Echizen (JP); Nobuyuki Takahata, Echizen (JP); Yasuhiro Mitta, Echizen (JP)

(73) Assignees: DAIKIN INDUSTRIES, LTD., Osaka (JP); NISSIN CHEMICAL INDUSTRY CO., LTD, Fukui (JP)

( * ) Notice: Subject to any disclaimer, the term of this patent is extended or adjusted under 35 U.S.C. 154(b) by 0 days.

(21) Appl. No.: 14/412,733

(22) PCT Filed: Jul. 4, 2013

(86) PCT No.: PCT/JP2013/068411
§ 371 (c)(1),
(2) Date: Jan. 5, 2015

(87) PCT Pub. No.: WO2014/007344
PCT Pub. Date: Jan. 9, 2014

(65) Prior Publication Data
US 2015/0191869 A1    Jul. 9, 2015

(30) Foreign Application Priority Data
Jul. 6, 2012  (JP) .................................. 2012-152747

(51) Int. Cl.
| | |
|---|---|
| *D06M 15/248* | (2006.01) |
| *C08F 14/00* | (2006.01) |
| *C08F 14/18* | (2006.01) |
| *C08F 259/00* | (2006.01) |
| *D06M 15/256* | (2006.01) |
| *D06M 15/277* | (2006.01) |
| *C08L 33/16* | (2006.01) |
| *C09D 133/16* | (2006.01) |
| *C08F 2/32* | (2006.01) |

(52) U.S. Cl.
CPC ............. *D06M 15/248* (2013.01); *C08F 14/00* (2013.01); *C08F 14/18* (2013.01); *C08F 259/00* (2013.01); *C08L 33/16* (2013.01); *C09D 133/16* (2013.01); *D06M 15/256* (2013.01); *D06M 15/277* (2013.01); *C08F 2/32* (2013.01); *C08L 2201/02* (2013.01); *Y10T 442/2172* (2015.04)

(58) Field of Classification Search
CPC ........ C08F 14/00; C08F 14/18; C08F 259/00; C08F 2/32; D06M 15/256; D06M 15/248; D06M 15/277; C09D 133/16; C08L 33/16; C08L 2201/02; C08L 2205/04
IPC ....................... C08F 14/00, 14/18, 259/00, 2/32
See application file for complete search history.

(56) References Cited

U.S. PATENT DOCUMENTS

| | | | |
|---|---|---|---|
| 5,057,577 A | 10/1991 | Matsuo et al. | |
| 5,247,008 A | 9/1993 | Michels et al. | |
| 5,898,042 A | 4/1999 | Sawada et al. | |
| 6,515,077 B1 * | 2/2003 | Su et al. ................ | C08F 255/10 264/104 |
| 7,851,084 B2 | 12/2010 | Sakuma et al. | |
| 2003/0052576 A1 * | 3/2003 | St. Clair et al. ........ | C08F 259/00 310/309 |
| 2006/0148353 A1 | 7/2006 | Aga et al. | |
| 2009/0085001 A1 | 4/2009 | Furuta et al. | |
| 2010/0179287 A1 | 7/2010 | Sugiyama et al. | |

FOREIGN PATENT DOCUMENTS

| | | |
|---|---|---|
| CN | 101809112 A | 8/2010 |
| EP | 2 762 504 A1 | 8/2014 |
| JP | 2-1795 A | 1/1990 |
| JP | 6-56944 A | 3/1994 |
| JP | 7-278422 A | 10/1995 |
| JP | 9-118877 A | 5/1997 |
| JP | 11-172126 A | 6/1999 |
| JP | 11-246639 A | 9/1999 |
| JP | 2007-291373 A | 11/2007 |
| JP | 2009-155591 A | 7/2009 |
| WO | 2004/069924 A1 | 8/2004 |
| WO | 2013/046851 A1 | 4/2013 |

OTHER PUBLICATIONS

International Search Report for PCT/JP2013/068411 dated Sep. 3, 2013.
Communication issued Jan. 6, 2015 from The International Bureau of WIPO in counterpart International Patent Application No. PCT/JP2013/068411.

* cited by examiner

*Primary Examiner* — Nathan M Nutter
(74) *Attorney, Agent, or Firm* — Sughrue Mion, PLLC

(57) ABSTRACT

Provided is a water and oil repellent composition that provides water and oil repellency that is excellent for base materials such as textile products, and is excellent for preventing adhesion of polymers on rolls during processing. The present invention involves a method for manufacturing a fluorine-containing polymer comprising a first polymer formed from a first monomer, and a second polymer formed from a second monomer. The manufacturing method includes: (I) a step for obtaining the first polymer by polymerizing the first monomer; and (II) a step for obtaining the second polymer by preparing and polymerizing the second monomer in the presence of the first polymer. The first monomer and/or the second monomer includes a fluorine-containing monomer (a), and both the first monomer and the second monomer include a halogenated olefin (b).

28 Claims, No Drawings

METHOD FOR MANUFACTURING FLUORINE-CONTAINING POLYMER

CROSS REFERENCE TO RELATED APPLICATIONS

This is a National Stage of International Application No. PCT/JP2013/0068411 filed Jul. 4, 2013, claiming priority based on Japanese Patent Application No. 2012-152747 filed Jul. 6, 2012, the contents of all of which are incorporated herein by reference in their entirety.

TECHNICAL FIELD

The present invention relates to a fluorine-containing polymer and a treatment composition, particularly a surface treatment composition comprising the polymer, which imparts excellent water repellency, oil repellency and soil resistance to a textile (for example, a carpet), a paper, a non-woven fabric, masonry, an electrostatic filter, a dust protective mask, and a part of fuel cell.

BACKGROUND ART

Hitherto, various fluorine-containing compounds are proposed. The fluorine-containing compounds have the advantageous effects of having properties excellent in heat resistance, oxidation resistance, weather resistance and the like. The fluorine-containing compounds are used as, for example, the water- and oil-repellent agent and soil release agent by utilizing the properties that the fluorine-containing compounds have low free energy, i.e., difficulty in adherence. For example, U.S. Pat. No. 5,247,008 discloses a finishing agent for textile, leather, paper and mineral substance, wherein said agent comprises an aqueous dispersion of a copolymer of a perfluoroalkyl ester of an acrylic acid or methacrylic acid, an alkyl ester of an acrylic acid or methacrylic acid and an aminoalkyl ester of an acrylic acid or methacrylic acid.

Moreover, conventionally in order to improve durability of the water- and oil-repellency to wash, dry cleaning, etc., it is attempted that a monomer containing an adhesive group is copolymerized with a polymerizable monomer containing a fluoroalkyl group, or a polymer having a high film strength is blended with a polymer containing a fluoroalkyl group. In the field of a paint (a coating agent), the use of a particulate polymer having multilayer structure has succeeded in maintaining the properties of fluorine and giving new properties of workability (for example, JP-06-56944A).

Moreover, in order to give properties such as durability and low-temperature cure properties, a composition comprising a particulate polymer having a multilayer structure is proposed (for example, JP-02-001795A, JP-07-278422A, JP-11-172126A and JP-2007-291373A).

A treatment bath of a water- and oil-repellent agent prepared by diluting a conventional general water dispersion liquid often gives troubles, such as a roll soil resulting in a fabric soil, wherein a dispersion liquid breaks by a mechanical impact received when a fabric to be treated enters, emulsion particles are aggregated and sedimentated and then the polymer adheres to a repellent roll. Although some methods excellent in stability of impurity are proposed (for example, JP-09-118877A and WO 2004/069924A), these methods cannot always give sufficiently satisfactory stability in connection with diversity of water- and oil-repellent treatment in recent years. As to the problem of adhesion of the polymer to the roll, the more the tackiness of polymer is, the more easily the problem arises. When the carbon number of the fluoroalkyl group in a fluoroalkyl group-containing polymer is 6 or less, there is the tendency that, since the polymer has lower melting point, the polymer has higher tackiness than the polymer having the carbon number of at least 8.

PRIOR ARTS DOCUMENTS

Patent Documents

Patent Document 1: U.S. Pat. No. 5,247,008
Patent Document 2: JP-06-56944A
Patent Document 3: JP-02-001795A
Patent Document 4: JP-07-278422A
Patent Document 5: JP-11-172126A
Patent Document 6: JP-2007-291373A
Patent Document 7: JP-09-118877A
Patent Document 8: WO2004/069924

SUMMARY OF INVENTION

Problems to be Solved by the Invention

A purpose of the present invention is to provide a water- and oil-repellent composition which can impart excellent water- and oil-repellency to substrates, such as textiles, and which has excellent prevention of the polymer adhesion to a roll in a processing treatment using the composition.

Means of Solving Problems

The inventors intensively studied for the purpose of providing a water- and oil-repellent composition which suppresses the preparation of a highly adhesive polymer portion, exhibits high water- and oil-repellency, and is excellent also in durability (particularly, wash durability of water- and oil-repellency), in order to solve the above-mentioned problems. As a result, by differing a polymerization initiation time between a polymer comprising a polymer unit having a specified chemical structure, and a polymer having a polymer unit formed from a monomer containing a fluoroalkyl group, the inventors discovered that the above-mentioned objects can be achieved to complete the present invention.

Means of Solving Problems

The present invention provides a fluorine-containing polymer comprising a first polymer formed from a first monomer, and a second polymer formed from a second monomer,
wherein the second monomer is polymerized in the presence of the first polymer,
at least one of the first monomer and the second monomer comprises a fluorine-containing monomer (a), and
both of the first monomer and the second monomer comprise a halogenated olefin monomer (b).

Further, the present invention provides a method of producing a fluorine-containing polymer comprising a first polymer formed from a first monomer, and a second polymer formed from a second monomer,
wherein the method comprises the steps of:
(I) polymerizing the first monomer to obtain the first polymer, and
(II) charging and polymerizing the second monomer in the presence of the first polymer to obtain the second polymer,
at least one of the first monomer and the second monomer comprises a fluorine-containing monomer (a), and
both of the first monomer and the second monomer comprise a halogenated olefin monomer (b).

Furthermore, the present invention provides a water- and oil-repellent agent which comprises the above-mentioned fluorine-containing polymer as an essential ingredient.

The fluorine-containing polymer has repeating units derived from a fluorine-containing monomer, and the repeating units derived from a fluorine-free monomer such as a halogenated olefin.

The fluorine-containing polymer can be manufactured by a fractional charge (or a divisional charge). The fractional charge conducts a 2-stage polymerization of the monomers. The "fractional charge" means that, in delay to the charge (polymerization initiation) of at least one monomer, the charge (polymerization initiation) of at least one other monomer is conducted. The "2-stage polymerization" means that, in the presence of the first polymer obtained by polymerizing the first monomer comprising at least one monomer, the second monomer comprising at least one other monomer is polymerized.

Effect of the Invention

According to the present invention, provided is a water- and oil-repellent composition which can impart excellent water- and oil-repellency to substrates, such as textiles, and which has excellent prevention of the polymer adhesion to a roll in a processing treatment using the composition. In addition, the durability of water- and oil-repellency is high.

EMBODIMENTS FOR CARRYING OUT THE INVENTION

The fluorine-containing polymer of the present invention has repeating units derived from the first monomer, and repeating units derived from the second monomer. The first polymer and the second polymer may be copolymerized. That is, the first polymer may be chemically bonded to the second polymer. Alternatively, the first polymer and the second polymer may not form chemical bonds, but may be physically bonded together. Examples of the physical bond include a core/shell structure in which the first polymer forms a core and the second polymer forms a shell. In the core/shell structure, although the first polymer and the second polymer may not be chemically bonded together, these may be chemically bonded together.

In the present invention, the fluorine-containing monomer (a) and the halogenated olefin monomer (b) are used as the monomer. Optionally, a fluorine-free non-crosslinkable monomer (c) and/or a fluorine-free crosslinkable monomer (d) may be used.

At least one of the first monomer and the second monomers comprises the fluorine-containing monomer. Preferably, the first monomer comprises the fluorine-containing monomer and the second monomer does not comprise the fluorine-containing monomer.

Both of the first monomer and the second monomer comprise the halogenated olefin monomer.

The first monomer may comprise the fluorine-free non-crosslinkable monomer. Preferably, the second monomer does not comprise a fluorine-free non-crosslinkable monomer. When the second monomer does not comprise the fluorine-free non-crosslinkable monomer, in the processing treatment of the treatment agent comprising the fluorine-containing polymer, the performance of preventing a roll dirt caused by a polymer adhesion to a roll is excellent.

At least one of the first monomer and the second monomers may comprise the fluorine-free crosslinkable monomer. When the fluorine-containing polymer comprises the fluorine-free crosslinkable monomer, the first monomer may not comprise the fluorine-free crosslinkable monomer, and the second monomer may comprise the fluorine-free crosslinkable monomer; or the first monomer may comprise the fluorine-free crosslinkable monomer, and the second monomer may not comprise the fluorine-free crosslinkable monomer.

Preferable types of monomers for the first monomer and the second monomer have the following embodiments.

TABLE 1

| Embodiment | FIRST MONOMER | SECOND MONOMER |
| --- | --- | --- |
| 1 | Fluorine-containing monomer, Halogenated olefin monomer | Halogenated olefin monomer |
| 2 | Fluorine-containing monomer, Halogenated olefin monomer, Fluorine-free non-crosslinkable monomer | Halogenated olefin monomer |
| 3 | Fluorine-free non-crosslinkable monomer, Halogenated olefin monomer | Halogenated olefin monomer, Fluorine-containing monomer |
| 4 | Fluorine-containing monomer, Halogenated olefin monomer | Halogenated olefin monomer, Fluorine-free crosslinkable monomer |
| 5 | Fluorine-free non-crosslinkable monomer, Halogenated olefin monomer | Halogenated olefin monomer, Fluorine-containing monomer, Fluorine-free crosslinkable monomer |
| 6 | Fluorine-containing monomer, Halogenated olefin monomer, Fluorine-free non-crosslinkable monomer | Halogenated olefin monomer, Fluorine-free crosslinkable monomer |
| 7 | Fluorine-containing monomer, Halogenated olefin monomer, Fluorine-free non-crosslinkable monomer, Fluorine-free crosslinkable monomer | Halogenated olefin monomer |

Each of the fluorine-containing monomer and the fluorine-free crosslinkable monomer may be present in both of the first monomer and the second monomer. That is, used can be the embodiments, which are the same as Embodiments 1-7 except that the fluorine-containing monomer is present in both of the first monomer and the second monomer, and the embodiments, which are the same as Embodiments 1-7 except that the fluorine-free crosslinkable monomer is present in both of the first monomer and the second monomer.

(a) Fluorine-Containing Monomer

The fluorine-containing monomer may be represented by the formula:

CH$_2$=C(—X)—C(=O)—Y—Z—Rf wherein
X is a hydrogen atom, a monovalent organic group or a halogen atom;
Y is —O— or —NH—;
Z is a direct bond or divalent organic group;
Rf is a fluoroalkyl group having 1 to 20 carbon atoms.

Z may be, for example, a linear alkylene group or branched alkylene group having 1 to 20 carbon atoms, such as a group represented by the formula —(CH$_2$)$_x$— wherein x is from 1 to 10 or
a group represented by the formula —SO$_2$N(R$^1$)R$^2$— or by the formula —CON(R$^1$)R$^2$— wherein R$^1$ is an alkyl group having 1 to 10 carbon atoms and R$^2$ is a linear alkylene group or branched alkylene group having 1 to 10 carbon atoms or by the formula —CH$_2$CH(OR$^3$)CH$_2$— wherein R$^3$ is a hydrogen atom or an acyl group having 1 to 10 carbon atoms (for example, formyl group or acetyl group) or by the formula —Ar—CH$_2$— wherein Ar is an arylene group optionally having a substituent group, or by the formula —(CH$_2$)$_m$—SO$_2$—(CH$_2$)$_n$— group or —(CH$_2$)$_m$—S—(CH$_2$)$_n$— group wherein m is 1-10 and n is 0-10.

Specific examples of X are H, Me (methyl group), Cl, Br, I, F, CN and CF$_3$.

The fluorine-containing monomer (a) is preferably an acrylate ester or acrylamide represented by the formula:

CH$_2$=C(—X)—C(=O)—Y—Z—Rf    (1)

wherein
X is a hydrogen atom, a linear or branched alkyl group having 1 to 21 carbon atoms, a fluorine atom, a chlorine atom, a bromine atom, an iodine atom, a CFX$^1$X$^2$ group (where each of X$^1$ and X$^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group;
Y is —O— or —NH— group;
Z is an aliphatic group having 1 to 10 carbon atoms, an aromatic or cycloaliphatic group having 6 to 18 carbon atoms, a —CH$_2$CH$_2$N(R$^1$)SO$_2$— group (wherein R$^1$ is an alkyl group having 1 to 4 carbon atoms), a —CH$_2$CH(OZ$^1$)CH$_2$— group (wherein Z$^1$ is a hydrogen atom or an acetyl group), a —(CH$_2$)$_m$—SO$_2$—(CH$_2$)$_n$— group or a —(CH$_2$)$_m$—S—(CH$_2$)$_n$— group (wherein m is 1 to 10 and n is 0 to 10),
Rf is a linear or branched fluoroalkyl group having 1 to 20 carbon atoms.

The fluorine-containing monomer (a) may be substituted with a halogen atom or the like at the alpha-position (of acrylate or methacrylate). Therefore, in the formula (1), X may be a linear or branched alkyl group having 2 to 21 carbon atoms, a fluorine atom, a chlorine atom, a bromine atom, an iodine atom, a CFX$^1$X$^2$ group (wherein X$^1$ and X$^2$ represent a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group.

In the formula (1), the Rf group is preferably a perfluoroalkyl group. The carbon number of the Rf group is preferably from 1 to 12, for example, 1 to 6, particularly from 4 to 6. Examples of the Rf group include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$, —(CF$_2$)$_3$CF(CF$_3$)$_2$, —(CF$_2$)$_4$CF(CF$_3$)$_2$ and —C$_8$F$_{17}$.

Z is preferably an aliphatic group having 1 to 10 carbon atoms, an aromatic or cycloaliphatic group having 6 to 18 carbon atoms, —CH$_2$CH$_2$N(R$^1$)SO$_2$— group (wherein R$^1$ is an alkyl group having 1 to 4 carbon atoms) or —CH$_2$CH(OZ$^1$)CH$_2$— group (wherein Z$^1$ is a hydrogen atom or an acetyl group) or —(CH$_2$)$_m$—SO$_2$—(CH$_2$)$_n$— group or —(CH$_2$)$_m$—S—(CH$_2$)$_n$— group (wherein m is 1 to 10, and n is 0 to 10). The aliphatic group is preferably an alkylene group (having particularly 1 to 4, for example, 1 or 2 carbon atoms). The aromatic group or the cyclic aliphatic group may be substituted or unsubstituted. The S group or the SO$_2$ group may directly bond to the Rf group.

Specific examples of the fluorine-containing monomer (a) include, but are not limited to, the followings:

CH$_2$=C(—H)—C(=O)—O—(CH$_2$)$_2$—Rf

CH$_2$=C(—H)—C(=O)—O—C$_6$H$_4$—Rf

CH$_2$=C(—Cl)—C(=O)—O—(CH$_2$)$_2$—Rf

CH$_2$=C(—H)—C(=O)—O—(CH$_2$)$_2$N(—CH$_3$)
SO$_2$—Rf

CH$_2$=C(—H)—C(=O)—O—(CH$_2$)$_2$N(—C$_2$H$_5$)
SO$_2$—Rf

CH$_2$=C(—H)—C(=O)—O—CH$_2$CH(—OH)CH$_2$—
Rf

CH$_2$=C(—H)—C(=O)—O—CH$_2$CH(—OCOCH$_3$)
CH$_2$—Rf

CH$_2$=C(—H)—C(=O)—O—(CH$_2$)$_2$—S—Rf

CH$_2$=C(—H)—C(=O)—O—(CH$_2$)$_2$—S—(CH$_2$)$_2$—
Rf

CH$_2$=C(—H)—C(=O)—O—(CH$_2$)$_3$—SO$_2$—Rf

CH$_2$=C(—H)—C(=O)—O—(CH$_2$)$_2$—SO$_2$—
(CH$_2$)$_2$—Rf

CH$_2$=C(—H)—C(=O)—NH—(CH$_2$)$_2$—Rf

CH$_2$=C(—CH$_3$)—C(=O)—O—(CH$_2$)$_2$—S—Rf

CH$_2$=C(—CH$_3$)—C(=O)—O—(CH$_2$)$_2$—S—
(CH$_2$)$_2$—Rf

CH$_2$=C(—CH$_3$)—C(=O)—O—(CH$_2$)$_3$—SO$_2$—Rf

CH$_2$=C(—CH$_3$)—C(=O)—O—(CH$_2$)$_2$—SO$_2$—
(CH$_2$)$_2$—Rf

CH$_2$=C(—CH$_3$)—C(=O)—NH—(CH$_2$)$_2$—Rf

CH$_2$=C(—F)—C(=O)—O—(CH$_2$)$_2$—S—Rf

CH$_2$=C(—F)—C(=O)—O—(CH$_2$)$_2$—S—(CH$_2$)$_2$—
Rf

CH$_2$=C(—F)—C(=O)—O—(CH$_2$)$_2$—SO$_2$—Rf

CH$_2$=C(—F)—C(=O)—O—(CH$_2$)$_2$—SO$_2$—(CH$_2$)$_2$—Rf

CH$_2$=C(—F)—C(=O)—NH—(CH$_2$)$_2$—Rf

CH$_2$=C(—Cl)—C(=O)—O—(CH$_2$)$_2$—S—Rf

CH$_2$=C(—Cl)—C(=O)—O—(CH$_2$)$_2$—S—(CH$_2$)$_2$—Rf

CH$_2$=C(—Cl)—C(=O)—O—(CH$_2$)$_2$—SO$_2$—Rf

CH$_2$=C(—Cl)—C(=O)—O—(CH$_2$)$_2$—SO$_2$—(CH$_2$)$_2$—Rf

CH$_2$=C(—Cl)—C(=O)—NH—(CH$_2$)$_2$—Rf

CH$_2$=C(—CF$_3$)—C(=O)—O—(CH$_2$)$_2$—S—Rf

CH$_2$=C(—CF$_3$)—C(=O)—O—(CH$_2$)$_2$—S—(CH$_2$)$_2$—Rf

CH$_2$=C(—CF$_3$)—C(=O)—O—(CH$_2$)$_2$—SO$_2$—Rf

CH$_2$=C(—CF$_3$)—C(=O)—O—(CH$_2$)$_2$—SO$_2$—(CH$_2$)$_2$—Rf

CH$_2$=C(—CF$_3$)—C(=O)—NH—(CH$_2$)$_2$—Rf

CH$_2$=C(—CF$_2$H)—C(=O)—O—(CH$_2$)$_2$—S—Rf

CH$_2$=C(—CF$_2$H)—C(=O)—O—(CH$_2$)$_2$—S—(CH$_2$)$_2$—Rf

CH$_2$=C(—CF$_2$H)—C(=O)—O—(CH$_2$)$_2$—SO$_2$—Rf

CH$_2$=C(—CF$_2$H)—C(=O)—O—(CH$_2$)$_2$—SO$_2$—(CH$_2$)$_2$—Rf

CH$_2$=C(—CF$_2$H)—C(=O)—NH—(CH$_2$)$_2$—Rf

CH$_2$=C(—CN)—C(=O)—O—(CH$_2$)$_2$—S—Rf

CH$_2$=C(—CN)—C(=O)—O—(CH$_2$)$_2$—S—(CH$_2$)$_2$—Rf

CH$_2$=C(—CN)—C(=O)—O—(CH$_2$)$_2$—SO$_2$—Rf

CH$_2$=C(—CN)—C(=O)—O—(CH$_2$)$_2$—SO$_2$—(CH$_2$)$_2$—Rf

CH$_2$=C(—CN)—C(=O)—NH—(CH$_2$)$_2$—Rf

CH$_2$=C(—CF$_2$CF$_3$)—C(=O)—O—(CH$_2$)$_2$—S—Rf

CH$_2$=C(—CF$_2$CF$_3$)—C(=O)—O—(CH$_2$)$_2$—S—(CH$_2$)$_2$—Rf

CH$_2$=C(—CF$_2$CF$_3$)—C(=O)—O—(CH$_2$)$_2$—SO$_2$—Rf

CH$_2$=C(—CF$_2$CF$_3$)—C(=O)—O—(CH$_2$)$_2$—SO$_2$—(CH$_2$)$_2$—Rf

CH$_2$=C(—CF$_2$CF$_3$)—C(=O)—NH—(CH$_2$)$_2$—Rf

CH$_2$=C(—F)—C(=O)—O—(CH$_2$)$_3$—S—Rf

CH$_2$=C(—F)—C(=O)—O—(CH$_2$)$_3$—S—(CH$_2$)$_2$—Rf

CH$_2$=C(—F)—C(=O)—O—(CH$_2$)$_3$—SO$_2$—Rf

CH$_2$=C(—F)—C(=O)—O—(CH$_2$)$_3$—SO$_2$—(CH$_2$)$_2$—Rf

CH$_2$=C(—F)—C(=O)—NH—(CH$_2$)$_3$—Rf

CH$_2$=C(—Cl)—C(=O)—O—(CH$_2$)$_3$—S—Rf

CH$_2$=C(—Cl)—C(=O)—O—(CH$_2$)$_3$—S—(CH$_2$)$_2$—Rf

CH$_2$=C(—Cl)—C(=O)—O—(CH$_2$)$_3$—SO$_2$—Rf

CH$_2$=C(—Cl)—C(=O)—O—(CH$_2$)$_3$—SO$_2$—(CH$_2$)$_2$—Rf

CH$_2$=C(—CF$_3$)—C(=O)—O—(CH$_2$)$_3$—S—Rf

CH$_2$=C(—CF$_3$)—C(=O)—O—(CH$_2$)$_3$—S—(CH$_2$)$_2$—Rf

CH$_2$=C(—CF$_3$)—C(=O)—O—(CH$_2$)$_3$—SO$_2$—Rf

CH$_2$=C(—CF$_3$)—C(=O)—O—(CH$_2$)$_3$—SO$_2$—(CH$_2$)$_2$—Rf

CH$_2$=C(—CF$_2$H)—C(=O)—O—(CH$_2$)$_3$—S—Rf

CH$_2$=C(—CF$_2$H)—C(=O)—O—(CH$_2$)$_3$—S—(CH$_2$)$_2$—Rf

CH$_2$=C(—CF$_2$H)—C(=O)—O—(CH$_2$)$_3$—SO$_2$—Rf

CH$_2$=C(—CF$_2$H)—C(=O)—O—(CH$_2$)$_3$—SO$_2$—(CH$_2$)$_2$—Rf

CH$_2$=C(—CN)—C(=O)—O—(CH$_2$)$_3$—S—Rf

CH$_2$=C(—CN)—C(=O)—O—(CH$_2$)$_3$—S—(CH$_2$)$_2$—Rf

CH$_2$=C(—CN)—C(=O)—O—(CH$_2$)$_3$—SO$_2$—Rf

CH$_2$=C(—CN)—C(=O)—O—(CH$_2$)$_3$—SO$_2$—(CH$_2$)$_2$—Rf

CH$_2$=C(—CF$_2$CF$_3$)—C(=O)—O—(CH$_2$)$_3$—S—Rf

CH$_2$=C(—CF$_2$CF$_3$)—C(=O)—O—(CH$_2$)$_3$—S—(CH$_2$)$_2$—Rf

CH$_2$=C(—CF$_2$CF$_3$)—C(=O)—O—(CH$_2$)$_3$—SO$_2$—Rf

CH$_2$=C(—CF$_2$CF$_3$)—C(=O)—O—(CH$_2$)$_2$—SO$_2$—(CH$_2$)$_2$—Rf wherein Rf is a fluoroalkyl group having 1 to 20 carbon atoms.

(b) Halogenated Olefin Monomer

Preferably, the halogenated olefin monomer (b) is an olefin having 2-20 carbon atoms and substituted by 1-10 chlorine atoms, bromine atoms or iodine atoms. Preferably, the halogenated olefin monomer (b) is a chlorinated olefin having 2-20 carbon atoms, particularly an olefin having 2-5 carbon atoms carbon and having 1-5 chlorine atoms. Preferable examples of the halogenated olefin monomer (b) are a vinyl halide such as vinyl chloride, vinyl bromide and vinyl iodide, and a vinylidene halide such as vinylidene chloride, vinylidene bromide and vinylidene iodide. Vinyl chloride is preferable, because the water- and oil-repellency (particularly, the durability of the water- and oil-repellency) is high.

(c) Fluorine-Free Non-Crosslinkable Monomer

The fluorine-free non-crosslinkable monomer (c) is a monomer which does not contain a fluorine atom. The fluorine-free non-crosslinkable monomer (c) does not have a crosslinkable functional group. Unlike the crosslinkable monomer (d), the fluorine-free non-crosslinkable monomer (c) has no crosslinkability. Preferably, the fluorine-free non-crosslinkable monomer (c) is a fluorine-free monomer having a carbon-carbon double bond. The fluorine-free non-crosslinkable monomer (c) is preferably a vinyl monomer free from fluorine. Generally, the fluorine-free non-crosslinkable monomer (c) is a compound having one carbon-carbon double bond.

A preferable fluorine-free non-crosslinkable monomer (c) is represented by the formula:

$$CH_2=CA-T$$

wherein A is a hydrogen atom, a methyl group, or a halogen atom other than a fluorine atom (for example, a chlorine atom, a bromine atom, and an iodine atom), and
T is a hydrogen atom, an open-chain or cyclic hydrocarbon group having 1 to 30 (for example, 1-20) carbon atoms, or an open-chain or cyclic organic group having 1 to 31 (for example, 1-20) carbon atoms and an ester bond.

Examples of the open-chain or cyclic hydrocarbon group having 1-30 carbon atoms are a linear or branched aliphatic hydrocarbon group having 1-30 carbon atoms, a cyclic aliphatic group having 4-30 carbon atoms, an aromatic hydrocarbon group having 6-30 carbon atoms, and an araliphatic hydrocarbon group having 7-30 carbon atoms.

Examples of the open-chain or cyclic organic group having 1-31 carbon atoms and an ester bond are: —C(=O)—O-Q and —O—C(=O)-Q wherein Q is a linear or branched aliphatic hydrocarbon group having 1-30 carbon atoms, a cyclic aliphatic group having 4-30 carbon atoms, an aromatic hydrocarbon group having 6-30 carbon atoms, or an araliphatic hydrocarbon group having 7-30 carbon atoms. Preferable are a linear or branched aliphatic hydrocarbon group having 12-30 (particularly 18-30) carbon atoms, a cyclic aliphatic group having 4-30 carbon atoms, an aromatic hydrocarbon group having 6-30 carbon atoms, and an araliphatic hydrocarbon group having 7-30 carbon atoms. More preferable are a linear or branched aliphatic hydrocarbon group having 12-30 (particularly 18-30) carbon atoms, and a cyclic aliphatic group having 4-30 carbon atoms.

Preferable examples of the fluorine-free non-crosslinkable monomer (c) are, for example, ethylene, vinyl acetate, acrylonitrile, styrene, a poly(ethyleneglycol) (meth)acrylate, polypropyleneglycol (meth)acrylate, methoxypolyethyleneglycol (meth)acrylate, methoxypolypropyleneglycol (meth)acrylate, and vinyl alkyl ether. The fluorine-free non-crosslinkable monomer (c) is not limited to these examples.

The fluorine-free non-crosslinkable monomer (c) may be (meth)acrylate ester having an alkyl group. The number of the carbon atoms in the alkyl group may be from 1 to 30, for example, from 6 to 30 (e.g., from 10 to 30, particularly 18 to 30). For example, the fluorine-free monomer (c) may be acrylates of the general formula:

$$CH_2=CA^1COOA^2$$

wherein $A^1$ is a hydrogen atom, a methyl group, or a halogen atom other than a fluorine atom (for example, a chlorine atom, a bromine atom, and an iodine atom), and
$A^2$ is an alkyl group represented by $C_nH_{2n+1}$ (n=1 to 30).

Preferably, the fluorine-containing polymer has repeating units derived from the acrylate ($CH_2=CA^1COOA^2$) wherein $A^2$ is an alkyl group having 12 to 30 carbon atoms, particularly 18 to 30 carbon atoms, since the prevention of polymer adhesion to a roll is high.

The fluorine-free non-crosslinkable monomer (c) may be a (meth)acrylate monomer having a cyclic hydrocarbon group. The (meth)acrylate monomer having a cyclic hydrocarbon group is a compound having (preferably monovalent) cyclic hydrocarbon group and monovalent (meth)acrylate group. The monovalent cyclic hydrocarbon group directly bonds to the monovalent (meth)acrylate group. Examples of the cyclic hydrocarbon group include a saturated or unsaturated, monocyclic group, polycyclic group or bridged ring group. The cyclic hydrocarbon group is preferably a saturated group. The cyclic hydrocarbon group preferably has from 4 to 20 carbon atoms. Examples of the cyclic hydrocarbon group include a cycloaliphatic group having 4 to 20 carbon atoms, particularly 5 to 12 carbon atoms, an aromatic group having 6 to 20 carbon atoms, and an araliphatic group having 7 to 20 carbon atoms. The number of carbon atoms in the cyclic hydrocarbon group is particularly preferably at most 15, for example, at most 10. A carbon atom in the cyclic hydrocarbon group preferably directly bonds to an ester group in the (meth)acrylate group. The cyclic hydrocarbon group is preferably a saturated cycloaliphatic group. Specific examples of the cyclic hydrocarbon group include a cyclohexyl group, a t-butyl cyclohexyl group, an isobornyl group, a dicyclopentanyl group and a dicyclopentenyl group. The (meth)acrylate group is an acrylate group or a methacrylate group, preferably a methacrylate group. Specific examples of the monomer having a cyclic hydrocarbon group include cyclohexyl methacrylate, t-butylcyclohexyl methacrylate, benzyl methacrylate, isobornyl methacrylate, isobornyl acrylate, dicyclopentanyl methacrylate, dicyclopentanyl acrylate, and dicyclopentenyl acrylate.

(d) Fluorine-Free Crosslinkable Monomer

The fluorine-containing polymer of the present invention may have repeating units derived from the fluorine-free crosslinkable monomer (d). The fluorine-free crosslinkable monomer (d) is a monomer free from a fluorine atom. The fluorine-free crosslinkable monomer (d) has at least two reactive groups and/or carbon-carbon double bonds. The fluorine-free crosslinkable monomer (d) may be a compound which has at least two carbon-carbon double bonds or a compound which has at least one carbon-carbon double bond and at least one reactive group. Examples of the reactive group include a hydroxyl group, an epoxy group, a chloromethyl group, a blocked isocyanate group, an amino group and a carboxyl group. The fluorine-free crosslinkable monomer (d) may be a mono(meth)acrylate, (meth)diacrylate, or mono(meth)acrylamide having a reactive group. Alternatively, the fluorine-free crosslinkable monomer (d) may be di(meth)acrylate.

Examples of the crosslinkable monomer (d) include, but are not limited to, diacetone(meth)acrylamide, (meth)acrylamide, N-methylol(meth)acrylamide, hydroxymethyl (meth)acrylate, hydroxyethyl (meth)acrylate, 3-chloro-2-hydroxypropyl (meth)acrylate, 2-acetoacetoxyethyl (meth)acrylate, butadiene, isoprene, chloroprene, glycidyl (meth)acrylate, 1,6-hexanediol di(meth)acrylate, and neopentylglycol di(meth)acrylate.

The term "(meth)acrylate" as used herein means an acrylate or methacrylate, and the term "(meth)acrylamide" as used herein means an acrylamide or methacrylamide.

When the fluorine-free non-crosslinkable monomer (c) and/or the fluorine-free crosslinkable monomer (d) are copolymerized, various properties such as water- and oil-repellency, stain-proofing properties, cleaning durability and washing durability of said properties, solubility in solvents, hardness and feeling may be improved depending on the necessity.

In the fluorine-containing polymer,
the amount of the halogenated olefin (b) may be from 2 to 500 parts by weight, for example, from 5 to 200 parts by weight, especially from 20 to 150 parts by weight,
the amount of the fluorine-free non-crosslinkable monomer (c) may be 1,000 parts by weight or less, for example, from 0.1 to 300 parts by weight, especially from 1 to 200 parts by weight, and
the amount of the fluorine-free crosslinkable monomer (d) may be 50 parts by weight or less, for example, 30 parts by weight or less, especially from 0.1 to 20 parts by weight,
based on 100 parts by weight of the fluorine-containing monomers (a).

With respect to the amount of the halogenation olefin monomer, the weight ratio of the halogenation olefin monomer in the first monomer to the halogenation olefin monomer in the second monomer may be 3-97:97-3, for example, 5-50:95-50, especially 8-40:92-60. Alternatively, a rate of the halogenation olefin monomer in the first monomer is preferably from 0.1 to 49 by weight, more preferably from 5 to 40 by weight, particularly preferably from 8 to 35 by weight, especially preferably from 15 to 30 by weight, based on the total of the halogenation olefin monomer in the first monomer and the second monomer.

When the same type of the monomer (for example, the fluorine-containing monomer) other than the halogenated olefin monomer is contained in both of the first monomer and the second monomer, a weight ratio of the same type monomer in the first monomer to the same type monomer (especially, halogenated olefin monomer) in the second monomer may be 3-97:97-3, for example, 5-90:95-10, especially 10-90:90-10.

The fluorine-containing polymer of the present invention can be produced by any of conventional polymerization methods and the polymerization condition can be optionally selected. The polymerization method includes, for example, a solution polymerization, a suspension polymerization and an emulsion polymerization.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples thereof include an ester (for example, ester having 2-30 carbon atoms, specifically ethyl acetate, butyl acetate), a ketone (for example, ketone having 2-30 carbon atoms, specifically methyl ethyl ketone, diisobutyl ketone), and an alcohol (for example, an alcohol having 1-30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized with using an oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol, ethanol and N-methyl-2-pyrrolidone. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent may be used in the polymerization. The molecular weight of the copolymer can be changed according to the amount of the chain transfer agent used. Examples of the chain transfer agent include a mercaptan group-containing compound (especially alkyl mercaptan (for example, having 1 to 30 carbon atoms)), such as lauryl mercaptan, thioglycol and thioglycerol, and a mineral salt such as sodium hypophosphite and sodium hydrogensulfite. The amount of the chain transfer agent may be within the range from 0.01 to 10 parts by weight, for example, from 0.1 to 5 parts by weight, based on 100 parts by weight of total of the monomers.

Generally, a liquid comprising the first monomer is subjected to a polymerization reaction to produce the first polymer, and then, a liquid comprising the first polymer and the second monomer is subjected to a polymer reaction to produce the second polymer, whereby the fluorine-containing polymer comprising the first polymer and the second polymer is obtained. The polymerization of the second polymer may be initiated during the polymerization of the first polymer, or the polymerization of the second polymer may be initiated after the completion of the polymerization of the first polymer. Alternatively, the polymerization of the second polymer may be initiated, after at least 10% (namely, 10 to 100%), for example, at least 40% (namely, 40 to 100%), especially at least 70% (namely, 70 to 100%) of the polymerization reaction of the first polymer (namely, the polymerization reaction of the first monomer) is conducted. The conduct rate (%) of the polymerization reaction (namely, a polymerization reaction progress rate %) means mol % of a reacted monomer (that is, a monomer which has been polymerized). For example, when the polymerization reaction is completed at 10%, a polymerized monomer is 10 mol % and an unreacted (unpolymerized) monomer is 90 mol %. When the first monomer is a combination of at least two types of monomers, mol % of the first monomer is based on total mol of at least two types of monomers in the first monomer.

The term "during the polymerization of the first polymer" means that the polymerization reaction of the first polymer (namely, the polymerization reaction of the first monomer) is not completely conducted. For example, after the polymerization of the first polymer is conducted in a range of at least 10% to less than 40%, in a rage of at least 40% to less than 70%, or in a range of at least 70% to less than 100% (particularly 80%-99%, especially 85%-98%), the polymerization of the second polymer may be initiated.

The term "after the completion of the polymerization" means that the polymerization reaction of the first polymer (namely, the polymerization reaction of the first monomer) is conducted at about 100%.

When the polymerization of the second polymer is initiated during the polymerization of the first polymer, the second polymer has repeat units derived from the first monomer and the second monomer. When the polymerization of a second polymer is initiated after the completion of the polymerization of the first polymer, the second polymer has repeat units derived only from the second monomer.

The charge of the first monomer may be performed by one package (that is, at one time), or may be performed continuously. Preferably, the charge of the first monomer is performed at one time.

The charge of the second monomer may be performed by one package, or may be performed continuously. Preferably, the continuous charge of the second monomer is conducted so that the pressure of a monomer gas (especially halogenated olefins, such as vinyl chloride) is constant during the polymerization of the second monomer.

In the fluorine-containing polymer of the present invention, the first polymer is or is not chemically bonded to the second polymer.

Preferably, an unreacted fluorine-free non-crosslinkable monomer is substantially absent in a polymerization system, at the time when the polymerization of the second monomer is initiated. The term "substantially absent" means that the amount of the unreacted fluorine-free non-crosslinkable monomer is at most 10 mol %, preferably at most 8 mol %, more preferably at most 5 mol %, particularly at most 3 mol %, especially at most 1 mol %, based on the charged fluorine-free non-crosslinkable monomer, at the time when the polymerization of the second monomer is initiated. The substantial absence of the fluorine-free non-crosslinkable monomer gives the excellent performance which prevents a roll dirt by polymer adhering to a roll, in the processing treatment of the treatment agent comprising the fluorine-containing polymer.

Preferably, the fluorine-containing polymer of the present invention is manufactured by emulsification polymerization. In the particles of the aqueous dispersion formed from the first polymer and the second polymer, the second polymer may surround around the first polymer, and/or the fluorine-containing polymer may have the core/shell structure wherein the core of the first polymer is surrounded by the shell of the second polymer.

The fluorine-containing polymer can be applied to fibrous substrates (such as textiles) by any known method to treat textiles in liquid. The concentration of the fluorine-containing polymer in the solution applied to the textiles may be within the range from 0.5 to 20% by weight or from 1 to 5% by weight. When the textile is a cloth, the cloth may be immersed in the solution or the solution may be adhered or sprayed to the cloth. The treated textiles are dried, preferably heated at a temperature between 100° C. and 200° C. in order to develop the oil repellency.

Alternatively, the fluorine-containing polymer can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The method of the invention generally also renders the textile hydrophobic and water repellent.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The surface treatment agent of the present invention is preferably in the form of a solution, an emulsion or an aerosol. The surface treatment agent generally comprises the fluorine-containing polymer (active ingredient of the surface treatment agent) and a medium (particularly a liquid medium, for example, an organic solvent and/or water). The concentration of the fluorine-containing polymer in the surface treatment agent may be, for example, from 0.01 to 50% by weight.

The surface treatment agent of the present invention preferably comprises a fluorine-containing polymer and an aqueous medium. As used herein, the term "aqueous medium" means a medium consisting of water alone, as well as a medium comprising, in addition to water, an organic solvent (the amount of the organic solvent is at most 80 parts by weight, for example, 0.1 to 50 parts by weight, particularly 5 to 30 parts by weight based on 100 parts by weight of water). The fluorine-containing polymer is preferably produced by preparing a dispersion of the fluorine-containing polymer by the emulsion polymerization. The surface treatment agent of the present invention preferably comprises an aqueous dispersion of the particles of a fluorine-containing polymer in an aqueous medium. The particles of the fluorine-containing polymer in the dispersion preferably have an average particle size of from 0.01 to 200 micrometer, for example from 0.1 to 5 micrometer, particularly from 0.05 to 0.2 micrometer. The average particle size may be measured by a dynamic light-scattering device, electron microscope, etc.

The surface treatment agent can be applied to a substrate to be treated by a know procedure. Usually, the surface treatment agent is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the surface treatment agent. The concentration of the fluorine-containing compound in the treatment liquid contacted with the substrate may be from 0.01 to 10% by weight (particularly for immersion coating), for example, from 0.05 to 10% by weight (particularly for spray coating), based on the treatment liquid.

The substrate to be treated with the surface treatment agent (for example, a water- and oil-repellent agent) of the present invention is preferably a textile. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The textile may be in any form such as a fiber, a yarn and a fabric.

The term "treatment" means that the treatment agent is applied to the substrate by immersion, spray, coating or the like. The treatment gives the result that a fluorine-containing polymer which is an active component of the treatment agent is penetrated into internal parts of the substrate and/or adhered to surfaces of the substrate.

EXAMPLES

The present invention is now described in detail by way of Examples, Comparative Examples and Test Examples. However, the present invention is not limited to these Examples.

In the following Examples, parts and % are parts by weight and % by weight, unless otherwise specified.

The properties were measured as follows:

Stability of Polymer Dispersion Liquid

Stability of the polymer dispersion liquid was evaluated as follows by visually observing a reaction scale adhering onto an autoclave after the polymerization.

Very good: No reaction scale adhesion
Good: Slight reaction scale adhesion
Fine: Small reaction scale adhesion
Bad: Large reaction scale adhesion Tackiness of Polymer A liquid obtained by dispersing 10 g of an aqueous dispersion liquid of a polymer in 20 g of methanol was centrifuged at 10,000 rpm for 60 minutes to separate the polymer from the emulsifier, whereby obtaining a sample polymer for measurement. The tackiness of this polymer was measured by a tacking testing machine TAC-2 (manufactured by RHESCA). The tackiness was measured by using a sample polymer amount of 0.1 g, a measurement temperature of 40° C., and a load of 500 gf.

Water Repellency No.

A treatment liquid was prepared by diluting the aqueous dispersion liquid of polymer with water so that a solid concentration was 1% by weight. After immersing a nylon cloth in the treatment liquid, squeezing the cloth with an mangle at 4 kg/cm$^2$ and 4 m/min. with a mangle and heat-treating the cloth for 1 minute at 170° C., the water repellency of the treated cloth was evaluated.

The water repellency was evaluated, before wash (HL0) and after repeating a wash 5 times or 10 times (water-repellent durability) (HL5 or HL10) according to AATCC 88B (1) (III). The water repellency was expressed by water repellency No. (as shown in the following Table I) according to a spray method of JIS-L-1092.

TABLE I

| Water repellency No. | State |
|---|---|
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Example 1

Into a 1 L autoclave, $C_6F_{13}CH_2CH_2OCOC(CH_3)=CH_2$ (C6SFMA) (179 g), stearyl acrylate (StA) (25 g), tripropylene glycol (75.8 g), pure water (446 g), polyoxyethylene lauryl ether (10.2 g), polyoxyethylene oleyl ether (2.47 g) and polyoxyethylene isotridecyl ether (7.6 g) were charged, and then warmed at 60° C. and dispersed for emulsification by a high pressure homogenizer. After the emulsification, vinyl chloride (6 g) was injected. 2,2-Azobis(2-amidinopropane) dihydrochloride (1.72 g) was added, and the reaction was conducted at 61° C. for 1 hour (Polymerization reaction, C6SFMA: 99% conduct, and StA: 97% conduct). Vinyl chloride (54 g) was continuously added so that an internal pressure of the autoclave was maintained at 0.3 MPa, to further react at 61° C. for 4 hours, thereby obtaining an aqueous dispersion liquid of polymer. Properties of the aqueous dispersion, the concentration of which was adjusted with pure water to have a solid content of 30% by weight, were measured. The results are shown in Table A.

Example 2

A dispersion liquid of polymer was obtained in the same manner as in Example 1, except that, after the emulsification, vinyl chloride (15 g) was injected, the reaction was conducted at 61° C. for 1 hour (Polymerization reaction, C6SFMA: 99% conduct, and StA: 98% conduct), and vinyl chloride (45 g) was continuously added so that an internal pressure of the autoclave was maintained at 0.3 MPa, to further react at 61° C. for 4 hours.

Example 3

A dispersion liquid of polymer was obtained in the same manner as in Example 1, except that, after the emulsification, vinyl chloride (15 g) was injected, the reaction was conducted at 61° C. for 1 hour (Polymerization reaction, C6SFMA: 99% conduct, and StA: 97% conduct), and vinyl chloride (60 g) was continuously added so that an internal pressure of the autoclave was maintained at 0.3 MPa, to further react at 61° C. for 5 hours.

Example 4

A dispersion liquid of polymer was obtained in the same manner as in Example 1, except that, after the emulsification, vinyl chloride (15 g) was injected, the reaction was conducted at 61° C. for 1 hour (Polymerization reaction, C6SFMA: 99% conduct, and StA: 96% conduct), and vinyl chloride (75 g) was continuously added so that an internal pressure of the autoclave was maintained at 0.3 MPa, to further react at 61° C. for 6 hours.

Example 5

A dispersion liquid of polymer was obtained in the same manner as in Example 1, except that, after the emulsification, vinyl chloride (15 g) was injected, the reaction was conducted at 61° C. for 1 hour (Polymerization reaction, C6SFMA: 99% conduct, and StA: 95% conduct), octyl mercaptan (0.075 g) was injected, and vinyl chloride (45 g) was continuously added so that an internal pressure of the autoclave was maintained at 0.3 MPa, to further react at 61° C. for 4.5 hours.

Comparative Example 1

Into a 1 L autoclave, $C_6F_{13}CH_2CH_2OCOC(CH_3)=CH_2$ (179 g), stearyl acrylate (25 g), tripropylene glycol (75.8 g), pure water (446 g), polyoxyethylene lauryl ether (10.2 g), polyoxyethylene oleyl ether (2.47 g) and polyoxyethylene isotridecyl ether (7.6 g) were charged, and then warmed at 60° C. and dispersed for emulsification by a high pressure homogenizer. After the emulsification, 2,2-azobis(2-amidinopropane)dihydrochloride (1.72 g) was added, and the reaction was conducted at 60° C. for 1 hour (Polymerization reaction, C6SFMA: 99% conduct, and StA: 95% conduct). Vinyl chloride (60 g) was added, to further react for 2 hours, thereby obtaining an aqueous dispersion liquid of polymer. Properties of the aqueous dispersion, the concentration of which was adjusted with pure water to have a solid content of 30% by weight, were measured. The results are shown in Table A.

Comparative Example 2

Into a 1 L autoclave, $C_6F_{13}CH_2CH_2OCOC(CH_3)=CH_2$ (179 g), stearyl acrylate (StA) (25 g), tripropylene glycol (75.8 g), pure water (446 g), polyoxyethylene lauryl ether (10.2 g), polyoxyethylene oleyl ether (2.47 g) and polyoxyethylene isotridecyl ether (7.6 g) were charged, and then warmed at 60° C. and dispersed for emulsification by a high pressure homogenizer. After the emulsification, vinyl chloride (60 g) was injected. Further, 2,2-azobis-(2-amidinopropane)dihydrochloride (1.72 g) was added and a reaction was conducted at 60° C. for 3 hours to obtain an aqueous dispersion of a polymer. Properties of the aqueous dispersion, the concentration of which was adjusted with pure water to have a solid content of 30% by weight, were measured.

The results in each of Examples are shown in Table A.

INDUSTRIAL APPLICABILITY

The treatment composition comprising the fluorine-containing polymer according to the present invention can be used as an agent such as water- and oil-repellent agent and a soil release agent, which impart excellent water repellency, oil repellency and soil resistance to a textile (for example, a carpet), a paper, a non-woven fabric, masonry, an electrostatic filter, a dust protective mask, and a part of fuel cell.

The invention claimed is:
1. A fluorine-containing polymer comprising a first polymer formed from a first monomer, and a second polymer formed from a second monomer,
wherein the second monomer is polymerized in the presence of the first polymer,
at least one of the first monomer and the second monomer comprises a fluorine-containing monomer (a),
both of the first monomer and the second monomer comprise a halogenated olefin monomer (b),
the first monomer comprises a fluorine-free non-crosslinkable monomer (c) which is other than the halogenated monomer (b),
the fluorine-containing monomer (a) is represented by the formula:

$$CH_2=C(-X)-C(=O)-Y-Z-Rf$$

wherein
X is a hydrogen atom, a monovalent organic group or a halogen atom;
Y is —O— or —NH—;
Z is a direct bond or divalent organic group;
Rf is a fluoroalkyl group having 4 to 6 carbon atoms, and
the fluorine-free non-crosslinkable monomer (c) is represented by the formula:

$$CH_2=CA-T$$

wherein A is a hydrogen atom, a methyl group, or a halogen atom other than a fluorine atom, T is a hydrogen atom, an open-chain or cyclic hydrocarbon group having 1 to 30 carbon atoms, or an open-chain or cyclic organic group having 1 to 31 carbon atoms and having an ester bond.
2. The fluorine-containing polymer according to claim 1, wherein a rate of the halogenation olefin monomer in the first monomer is from 0.1% to 49% by weight, based on the total of the halogenation olefin monomer in the first monomer and the second monomer.

TABLE A

| | | | Ex. 1 | Ex. 2 | Ex. 3 | Ex. 4 | Ex. 5 | Com. Ex. 1 | Com. Ex. 2 |
|---|---|---|---|---|---|---|---|---|---|
| VCM charge ratio | | | 10/90 | 25/75 | 20/80 | 17/83 | 25/75 | 0/100 | 100/0 |
| | | | Two-stage polymerization | | | | | | One package polymerization |
| Polymerization conditions for first monomer | VCM weight ratio | % | 10 | 25 | 20 | 17 | 25 | 0 | 100 |
| | VCM amount | g | 6 | 15 | 15 | 15 | 15 | 0 | 60 |
| Polymerization conditions for second monomer | VCM weight ratio | % | 90 | 75 | 80 | 83 | 75 | 100 | — |
| | VCM amount | g | 54 | 45 | 60 | 75 | 45 | 60 | — |
| Stability of polymer dispersion | | | Good | Very good | Very good | Good | Good | Bad | Very good |
| Tackiness of polymer | | | 88 | 68 | 39 | 42 | 92 | 135 | 704 |
| Water repellency and durability | 170° C. × 1 min | HL0 | 100 | 100 | 100 | 100 | 100 | 100 | 100 |
| | | HL5 | 95 | 95 | 95 | 95 | 95 | 80 | 100 |
| | | HL10 | 90 | 95 | 95 | 90 | 90 | 80 | 95 |

3. The fluorine-containing polymer according to claim 1, wherein the first monomer comprises the fluorine-containing monomer (a).

4. The fluorine-containing polymer according to claim 1, wherein the second monomer comprises the fluorine-containing monomer (a).

5. The fluorine-containing polymer according to claim 1, wherein the second monomer does not contain a fluorine-free non-crosslinkable monomer (c).

6. The fluorine-containing polymer according to claim 1, wherein the second monomer comprises a fluorine-free crosslinkable monomer (d).

7. The fluorine-containing polymer according to claim 1, wherein the first polymer further comprises the fluorine-free crosslinkable monomer (d), in addition to the fluorine-containing monomer (a).

8. The fluorine-containing polymer according to claim 1, wherein the second polymer is formed from only the halogenated olefin monomer.

9. The fluorine-containing polymer according to claim 1, wherein the second polymer comprises at least one of the fluorine-containing monomer (a) and the fluorine-free crosslinkable monomer (d), in addition to the halogenated olefin monomer.

10. The fluorine-containing polymer according to claim 1, wherein the fluorine-containing monomer (a) is represented by the formula:

$$CH_2=C(-X)-C(=O)-Y-Z-Rf \quad (1)$$

wherein
X is a hydrogen atom, a linear or branched alkyl group having 1 to 21 carbon atoms, a fluorine atom, a chlorine atom, a bromine atom, an iodine atom, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group;
Y is —O— or —NH— group;
Z is an aliphatic group having 1 to 10 carbon atoms, an aromatic or cycloaliphatic group having 6 to 18 carbon atoms,
a —$CH_2CH_2N(R^1)SO_2$— group wherein $R^1$ is an alkyl group having 1 to 4 carbon atoms,
a —$CH_2CH(OZ^1)CH_2$— group wherein $Z^1$ is a hydrogen atom or an acetyl group,
a —$(CH_2)_m$—$SO_2$—$(CH_2)_n$— group or a —$(CH_2)_m$—S—$(CH_2)_n$— group wherein m is 1 to 10 and n is 0 to 10,
Rf is a linear or branched fluoroalkyl group having 4 to 6 carbon atoms.

11. The fluorine-containing polymer according to claim 1, wherein the halogenated olefin monomer (b) is an olefin having 2 to 20 carbon atoms and substituted by a chlorine atoms, a bromine atom or a iodine atom.

12. The fluorine-containing polymer according to claim 1, wherein the halogenated olefin monomer (b) is vinyl chloride, vinyl bromide, vinyl iodide, vinylidene chloride, vinylidene bromide or vinylidene iodide.

13. The fluorine-containing polymer according to claim 1, wherein the halogenated olefin monomer (b) is vinyl chloride.

14. The fluorine-containing polymer according to claim 1, wherein T is a long-chain hydrocarbon group having 12 to 30 carbon atoms, or a saturated cyclic hydrocarbon group, in the fluorine-free non-crosslinkable monomer (c).

15. The fluorine-containing polymer according to claim 1, wherein the fluorine-free non-crosslinkable monomer (c) is an acrylate represented by the general formula:

$$CH_2=CA^1COOA^2$$

wherein $A^1$ is a hydrogen atom, a methyl group, or a halogen atom other than a fluorine atom, and
$A^2$ is an alkyl group represented by $C_n$—$H_{2n+1}$ where n=1-30.

16. The fluorine-containing polymer according to claim 15, wherein $A^2$ is an alkyl group having 12 to 30 carbon atoms.

17. The fluorine-containing polymer according to claim 6, wherein the fluorine-free crosslinkable monomer (d) is a compound which has at least two reactive groups and/or carbon-carbon double bonds, and which does not contain fluoride.

18. A method of producing a fluorine-containing polymer comprising a first polymer formed from a first monomer, and a second polymer formed from a second monomer,
wherein the method comprises the steps of:
(I) polymerizing the first monomer to obtain the first polymer, and
(II) charging and polymerizing the second monomer in the presence of the first polymer to obtain the second polymer,
at least one of the first monomer and the second monomer comprises a fluorine-containing monomer (a),
both of the first monomer and the second monomer comprise a halogenated olefin monomer (b),
the first monomer comprises a fluorine-free non-crosslinkable monomer (c) which is other than the halogenated olefin monomer (b),
the fluorine-containing monomer (a) is represented by the formula:

$$CH_2=C(-X)-C(=O)-Y-Z-Rf$$

wherein
X is a hydrogen atom, a monovalent organic group or a halogen atom;
Y is —O— or —NH—;
Z is a direct bond or divalent organic group;
Rf is a fluoroalkyl group having 4 to 6 carbon atoms, and the fluorine-free non-crosslinkable monomer (c) is represented by the formula:

$$CH_2=CA\text{-}T$$

wherein A is a hydrogen atom, a methyl group, or a halogen atom other than a fluorine atom, T is a hydrogen atom, an open-chain or cyclic hydrocarbon group having 1 to 30 carbon atoms, or an open-chain or cyclic organic group having 1 to 31 carbon atoms and having an ester bond.

19. The method according to claim 18, wherein the second monomer is continuously charged.

20. The method according to claim 18, wherein a weight ratio of the halogenated olefin (b) in the first monomer to the halogenated olefin (b) in the second monomer is 3-97:97-3.

21. The method according to claim 18, wherein a polymerization of the second polymer is initiated during a polymerization of the first polymer.

22. The method according to claim 18, wherein a polymerization of the second polymer is initiated after completion of a polymerization of the first polymer.

23. The method according to claim 18, wherein the polymerization of the second polymer is initiated after at least 10% of the polymerization reaction of the first polymer is conducted.

24. A water- and oil-repellent agent which comprises the fluorine-containing polymer according to claim 1.

25. The water- and oil-repellent agent according to claim 24, which further contains an aqueous medium.

26. The water- and oil-repellent agent according to claim 24, which is an aqueous dispersion.

27. A method of treating a substrate, which comprises treating the substrate with the water- and oil-repellent agent according to claim 24.

28. A textile treated with the water- and oil-repellent agent according to claim 24.

\* \* \* \* \*